United States Patent
Yilmaz

(10) Patent No.: US 8,970,536 B2
(45) Date of Patent: Mar. 3, 2015

(54) TOUCHSCREEN ELECTRODE ARRANGEMENT WITH VARIED PROPORTIONATE DENSITY

(71) Applicant: Esat Yilmaz, Santa Cruz, CA (US)

(72) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/058,717

(22) Filed: Oct. 21, 2013

(65) Prior Publication Data

US 2014/0043294 A1    Feb. 13, 2014

Related U.S. Application Data

(63) Continuation of application No. 12/605,847, filed on Oct. 26, 2009, now Pat. No. 8,564,552.

(51) Int. Cl.
   *G06F 3/041* (2006.01)
   *G06F 3/044* (2006.01)

(52) U.S. Cl.
   CPC .............. *G06F 3/0412* (2013.01); *G06F 3/044* (2013.01)
   USPC ........................................ 345/173; 178/18.03

(58) Field of Classification Search
   CPC ........................................................ G06F 3/044
   USPC .......................... 345/173–174, 418, 206, 156; 178/18.01–18.11; 324/686
   See application file for complete search history.

(56) References Cited

U.S. PATENT DOCUMENTS

| | | | |
|---|---|---|---|
| 4,659,874 A * | 4/1987 | Landmeier .................. | 178/18.03 |
| 6,297,811 B1 * | 10/2001 | Kent et al. ...................... | 345/173 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2004/0119688 A1 * | 6/2004 | Troxell et al. .................. | 345/156 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Grant Sitta
*Assistant Examiner* — Charles Zheng
(74) *Attorney, Agent, or Firm* — Baker Botts LLP

(57) ABSTRACT

An assembly includes first electrode pairs and second electrode pairs distributed across an active area of a touchscreen. Each electrode pair of the first electrode pairs is formed in a pattern, the patterns of the first electrode pairs decreasing in frequency of snaking from electrode pair to electrode pair in a first direction. Each electrode pair of the second electrode pairs is formed in a pattern, the patterns of the second electrode pairs increasing in frequency of snaking from electrode pair to electrode pair in the first direction. A position of a touch can be determined in the first direction based at least in part on proportionate density of the first electrode pairs and the second electrode pairs in an area of the touch. At least one receive electrode in the first electrode pairs is directly coupled to at least one receive electrode in the second electrode pairs.

18 Claims, 6 Drawing Sheets

(56) References Cited

U.S. PATENT DOCUMENTS

| | | | |
|---|---|---|---|
| 2008/0006453 A1* | 1/2008 | Hotelling | 178/18.06 |
| 2008/0122074 A1* | 5/2008 | Wong et al. | 257/724 |
| 2008/0309627 A1* | 12/2008 | Hotelling et al. | 345/173 |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

OTHER PUBLICATIONS

U.S. Appl. No. 61/454,950, filed Mar. 21, 2011, Lynch.

U.S. Appl. No. 61/454,894, filed Mar. 21, 2011, Rothkopf.

"2009—Conductive Inkjet Technology", [online]. [retrieved Apr. 20, 2010]. Retrieved from the Internet: <URL: http://www.conductiveinkjet.com/about-us/latest-news/2009.aspx>, 1 pg.

"Cambrios Technologies Corporation Awarded Department of Defense Contract for Flexible Solar Cells", [online]. [retrieved Apr. 20, 2010]. Retrieved from the Internet: <URL: <http://www.cambrios.com/200/DOD_Release.htm>, (Apr. 12, 2010), 2 pgs.

"New Silver Conductive Inks Target High-Growth Touch Screen and OLED Markets", [online]. [retrieved Apr. 20, 2010]. Retrieved from the Internet: <URL: http://www2.dupont.com/MCM/en_US/news_events/article20100413.html>, (Apr. 13, 2010), 3 pgs.

"Printing of Antennas and Flexible Circuits", *Core Applications & Technologies*, (c) 2009 Conductive Inkjet Technology Ltd., (Oct. 2009), 23 pgs.

Hörteis, M., et al., "Fine Line Printed and Plated Contacts on High OHMIC Emitters Enabling 20% Cell Efficiency", *2009 34th IEEE Photovoltaic Specialists Conference (PVSC)*, (2009), 000060-000065.

* cited by examiner

TOUCHSCREEN ELECTRODE ARRANGEMENT WITH VARIED PROPORTIONATE DENSITY

RELATED APPLICATION

This application is a continuation, under 35 U.S.C. §120, of U.S. patent application Ser. No. 12/605,847, filed Oct. 26, 2009, and entitled "Touchscreen Electrode Arrangement with Varied Proportionate Density."

BACKGROUND

Touchscreen displays are able to detect a person's touch within the active or display area, such as detecting whether a finger is pressing a fixed-image touchscreen button or detecting the presence and position of a finger on a larger touchscreen display. Some touchscreens can also detect the presence of elements other than a finger, such as a stylus used to generate a digital signature, select objects, or perform other functions on a touchscreen display.

Use of a touchscreen as part of a display also allows an electronic device to change the display image, presenting different buttons, images, or other regions that can be selected, manipulated, or actuated by touch. Touchscreens can therefore provide an effective user interface for cell phones, GPS devices, personal digital assistants (PDAs), computers, ATM machines, appliances, and other such devices.

Touchscreens use various technologies to sense touch from a finger or stylus, such as resistive, capacitive, infrared, and acoustic sensors. Resistive sensors rely on touch to cause two resistive elements overlaying the display to contact one another completing a resistive circuit, while capacitive sensors rely on the capacitance of a finger changing the capacitance detected by an array of elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as indium tin oxide (ITO) or transparent conductive polymers to form an array over the display image, so that the display image can be seen through the conductive elements used to sense touch. The size, shape, and pattern of circuitry have an effect on the accuracy of the touchscreen, as well as on the visibility of the circuitry overlaying the display. Although a single layer of most suitable conductive elements is difficult to see when overlaying a display, multiple layers can be easier to see.

Further, more complex patterns of touchscreen elements can require more complex routing of lines connecting the elements to external circuitry used to sense touch, such as external circuitry that drives various touchscreen elements and that detects capacitance between multiple touchscreen elements.

For these and other reasons, efficient and effective design of touchscreen display elements is desired.

SUMMARY

A touchscreen display assembly includes an array of capacitively coupled electrode pairs distributed across an active area of the touchscreen. Electrode pairs may be configured in various snake patterns to vary the relative density between electrode pairs across the touchscreen. In some embodiments, pairs of closely spaced drive and receive electrodes form electrode pairs have varying snaking paths to vary the electrode pair density or length across the touchscreen. The position of a touch can be determined by the proportion of densities of electrodes in the area of the touch, such as by measuring capacitive coupling of the electrode pairs.

DETAILED DESCRIPTION

Touchscreens are often used as interfaces on small electronic devices, appliances, and other such electronic systems because the display behind the touchscreen can be easily adapted to provide instruction to the user and to receive various types of input, thereby providing an intuitive interface that requires very little user training to use effectively. Inexpensive and efficient touchscreen technologies enable incorporation of touchscreens into inexpensive commercial devices, but these technologies should also desirably be durable and have relatively high immunity to noise, moisture or dirt, or other unintended operation to ensure reliability and longevity of the touchscreen assembly.

Single layer touchscreen displays are therefore often used to control manufacturing costs, reduce routing complexity of multiple layers, and to ensure that the touchscreen element conductive layer is optically transparent when overlaying the display. Minimizing process steps to produce the touchscreen overlay and minimizing external wiring connections further reduce the cost of producing such a touchscreen display, and make interfacing the display with electronic control circuitry more straightforward and reliable.

Figure 1:
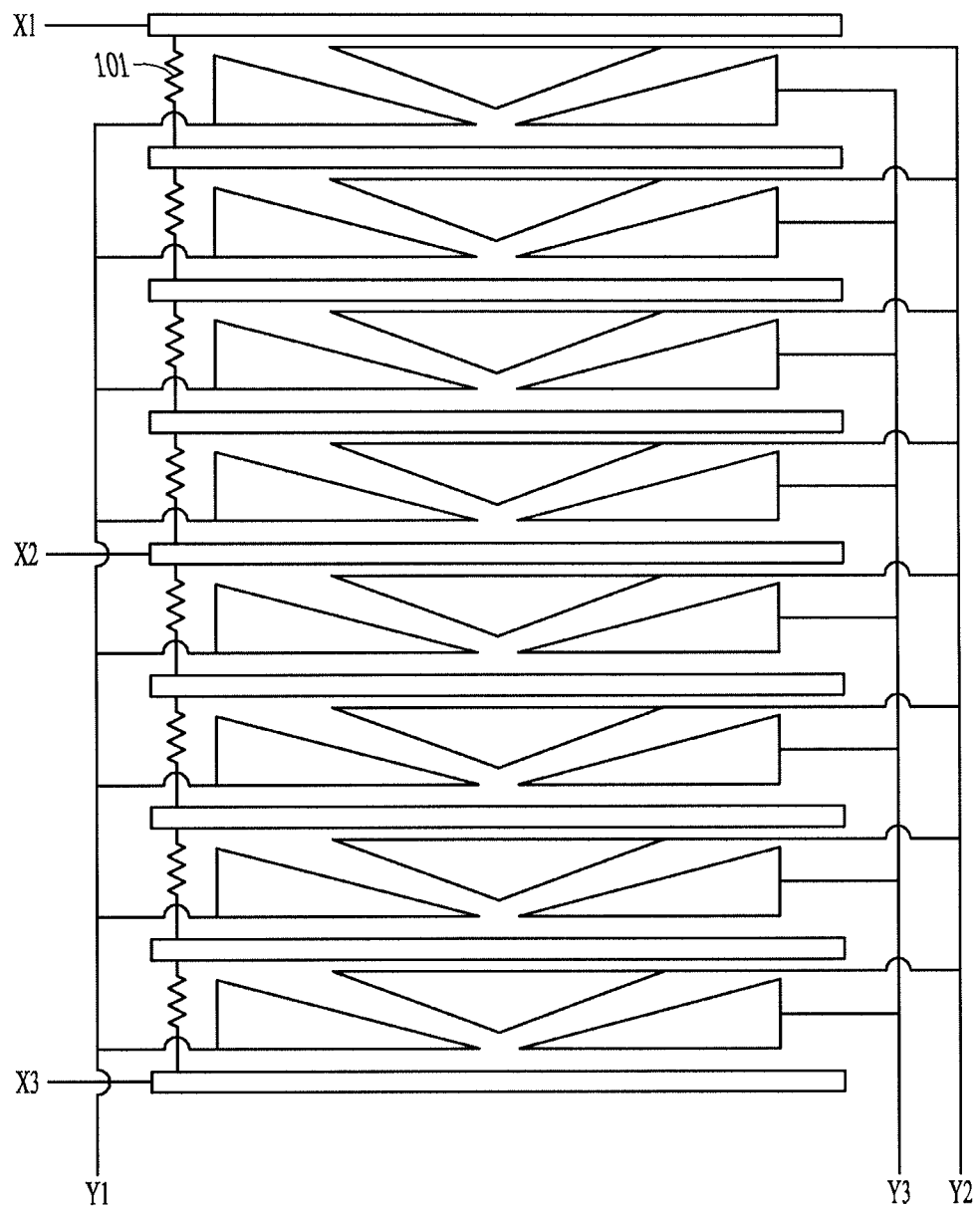
FIG. 1 shows a touchscreen assembly, consistent with the prior art.

FIG. 1 shows a typical example of such a single-layer mutual capacitance touchscreen display, consistent with the prior art. Here, the capacitance between drive electrodes (denoted with an "X") and various receive or sense electrodes (designated with a "Y") is monitored, and a change in mutual capacitance between the electrodes indicates the presence and position of a finger. Mutual capacitance sensor circuitry measures the capacitance between the X electrodes and the Y electrodes, which are covered by a dielectric overlay material that provides a sealed housing. When a finger is present, field coupling between the X and Y electrodes is attenuated, as the human body conducts away a portion of the field that arcs between the X and Y electrodes, reducing the measured capacitive coupling between the X and Y electrodes.

The X drive signals X1, X2, and X3 are here extended to various touchscreen drive elements using a resistor divider network chain of resistors 101, linking the elements between the X or drive electrodes and resulting in electrical interpolation of signals from the electrodes across the various X elements of the touchscreen. For example, the X element just below the X1 connection will receive a much stronger X1 drive signal than an X2 drive signal, and the proportion of X1 and X2 drive signal strengths that couple with the Y electrodes will indicate the relative vertical position of a finger on the display assembly shown. Similarly, a finger placed in the lower half of the display assembly of FIG. 1 will impact capacitive coupling between one of the X electrodes having some proportion of X2 and X3 drive signals, where the proportion indicates which X element is nearest the finger.

The Y elements of FIG. 1 are similarly split into three regions and have a tapered geometry, thereby providing geometric interpolation such that a finger's presence on the far left side of the touchscreen will affect capacitive coupling between X electrodes and a Y1 sense electrode, a touch near the center of the touchscreen will affect capacitive coupling between X electrodes and a Y2 sense electrode, and a touch near the right side of the touchscreen will affect capacitive coupling between X electrodes and a Y3 sense electrode. Touches somewhere between the center and sides of the touchscreen will affect capacitive coupling in proportion to the area of the tapered Y electrodes under the finger, making horizontal estimation of the finger's position determinable by evaluating the proportion of Y1, Y2, and Y3 capacitive coupling with the drive electrodes that is disrupted due to the finger's presence.

The touchscreen of FIG. 1 relies in part in the presence of resistors 101 to interpolate the X drive signals between the various X elements of the touchscreen, requiring not only that various conductive traces be laid down to form the touchscreen, but that the X element conductive traces also be electrically coupled to a network of resistive material having resistances that are controlled. This adds extra steps, and considerable cost and complexity to the production process.

One example touchscreen therefore includes capacitive touchscreen electrodes having fine line metal element pairs in proportionally varying densities across the active area of a touchscreen to determine position of a finger or other object such as a stylus. The density of the fine line metal electrodes vary in a more detailed example between a lower density, such as a straight line, and a higher density, such as a line having a high number of zig-zags or snaking that increases the electrode pair density or length within a given area.

Figure 2:
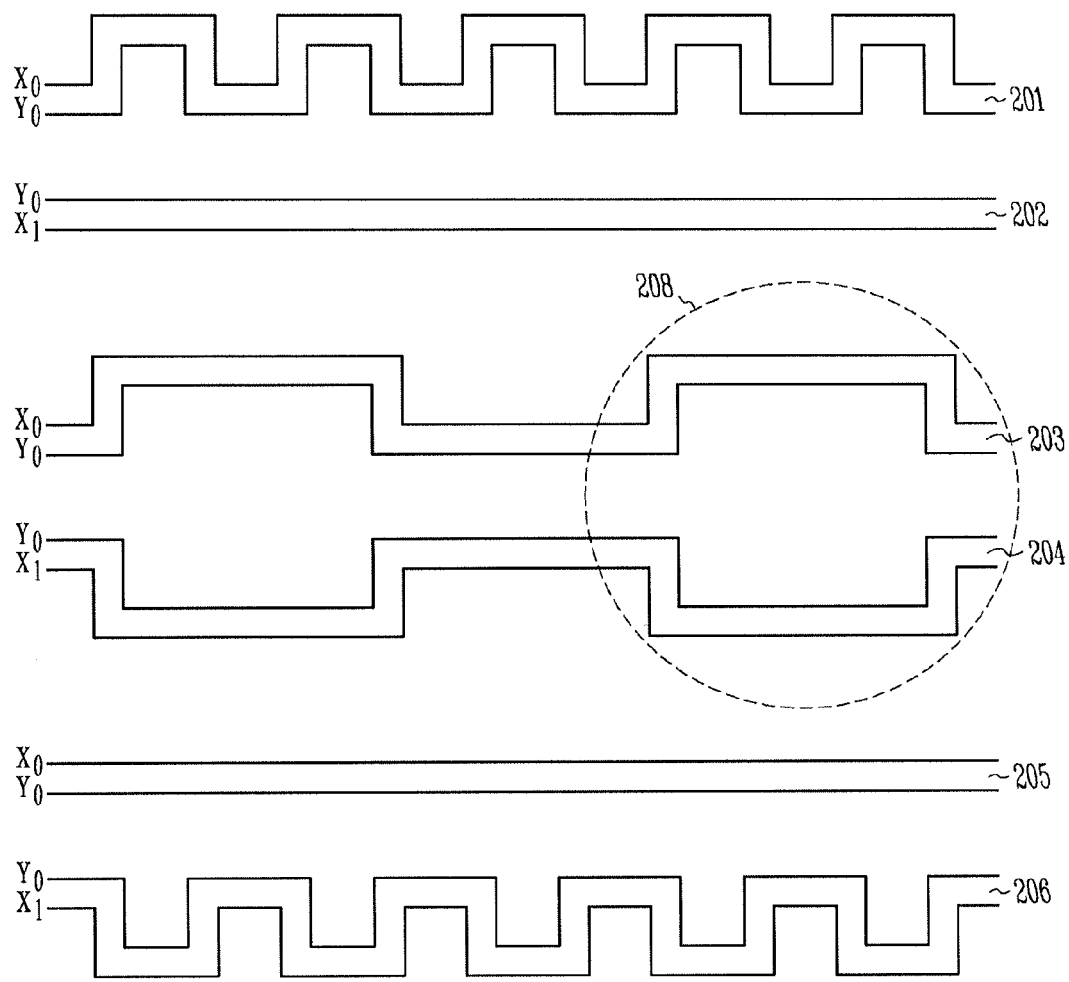
FIG. 2 illustrates a touchscreen having electrodes that vary in degree of snaking, consistent with an example embodiment.

FIG. 2 illustrates an example of using touchscreen line electrode snaking to proportionally vary the density of electrode pairs in a touchscreen. Here, the density of X0 and X1 electrode pairs varies from top to bottom, illustrating how variation of electrode pair density in one dimension can be used to determine position of a capacitive object near the touchscreen.

At 201, the X0 drive electrode runs parallel and close to a Y receive electrode denoted Y0, and are configured as X and Y electrode pairs that snake across the screen such that they have a relatively long line length and a relatively high line density in a given area. The neighboring pair of X1 drive and Y0 receive electrodes shown at 202 are straight, minimizing the line length across the screen as well as minimizing the line density of the X1 and Y0 line pair in a given area.

The proportional difference between the X0, Y0 and X1, Y0 electrode pairs as shown at 201 and 202 results in a different amount of line length under a finger that covers both line pairs, resulting in a greater capacitive coupling between the finger and the denser X0, Y0 line pair shown at 201 than with the straight X1, Y0 line pair shown at 202. This results in a proportionally larger reduction in the capacitance measured between X0 and Y0 than is observed between X1 and Y0, indicating that the finger is touching a region having a greater X0, Y0 line pair density than X1, Y0 line pair density. This indicates that the finger is touching near the top of the display.

Similarly, the X0, Y0 pair of electrodes at 205 have a relatively low line density and are straight, while the X1, Y0 pair of electrodes at 206 snake such that their line density in a given area is high, such that a touch covering lines 205 and 206 will result in proportionally larger reduction in the capacitance measured between X1 and Y0 than is observed between X0 and Y0. This indicates that the finger is touching a region having a greater X1, Y0 line pair density than X0, Y0 line pair density, near the bottom of the display.

The line pairs shown at 203 and 204 both have moderate line densities when compared to the relatively low line density of the line pair at 202 and the relatively high line density of the line pair at 201, and have line densities that are approximately the same. Because the X0, Y0 electrode pair shown at 203 is approximately a mirror of the X1, Y0 electrode pair shown at 204, a finger overlaying both line pairs 203 and 204 will affect the capacitive coupling of both line pairs approximately equally, indicating the finger is near the center of the touchscreen.

The electrode line pairs 203 and 204 are configured to have an intermediate line density such that if a finger overlaps line pairs 202 and 203, near the top-middle of the touchscreen, the reduction in capacitive coupling between the X0, Y0 line pair at 203 will be proportionally larger than in the X1, Y0 line pair at 202, but not as great as the proportional difference in capacitance reduction observed previously between line pairs 201 and 202 when a finger covered those line pairs. The touchscreen can therefore distinguish a finger that covers line pairs 201 and 202 from a finger that covers line pairs 202 and 203, just as it can distinguish a finger that covers line pairs 202 and 203 from a finger that covers line pairs 203 and 204.

This results in five distinct vertical zones on the touchscreen example of FIG. 2 that can be distinguished by observing the proportion of reduction in capacitance between X0, Y0 and X1, Y0 electrode line pairs. But, greater positional resolution can be obtained if the spacing between line pairs is such that a finger influences the capacitive coupling between multiple line pairs, and the scale of the snaking features of the lines is not overly large relative to the diameter of a touch.

Consider as an example a typical finger touch having a width of 5-8 mm, illustrated by the broken line region at 208 of FIG. 2. The finger touch region overlaps only line pairs 203 and 204, and the line spacing is configured such that a finger touch of typical size overlaps two or more line pairs. If the finger moves up slightly in this example, the finger area covers a greater portion of line pair 203 and a smaller portion of line pair 204, sufficient to cause an increase in capacitive coupling between the X1, Y0 line pair at 204 and a reduction in capacitive coupling between the X0, Y0 line pair at 203. External circuitry can use this information to determine the position of a finger on the display with accuracy much greater than simply determining which of five vertical zones is touched. A more detailed example includes fine metal lines that are approximately 10 micrometers or less in width, and occupy 3-7% of the total screen area, with features in approximate proportion to a finger touch region as shown in FIG. 2.

The electrode line pairs of FIG. 2 are configured so that the receive electrode of an electrode pair is not adjacent to the drive electrode of a neighboring electrode pair. This largely shields the Y receive line of each electrode pair from capacitively coupling with the X drive line of an adjacent electrode pair.

Figure 3:
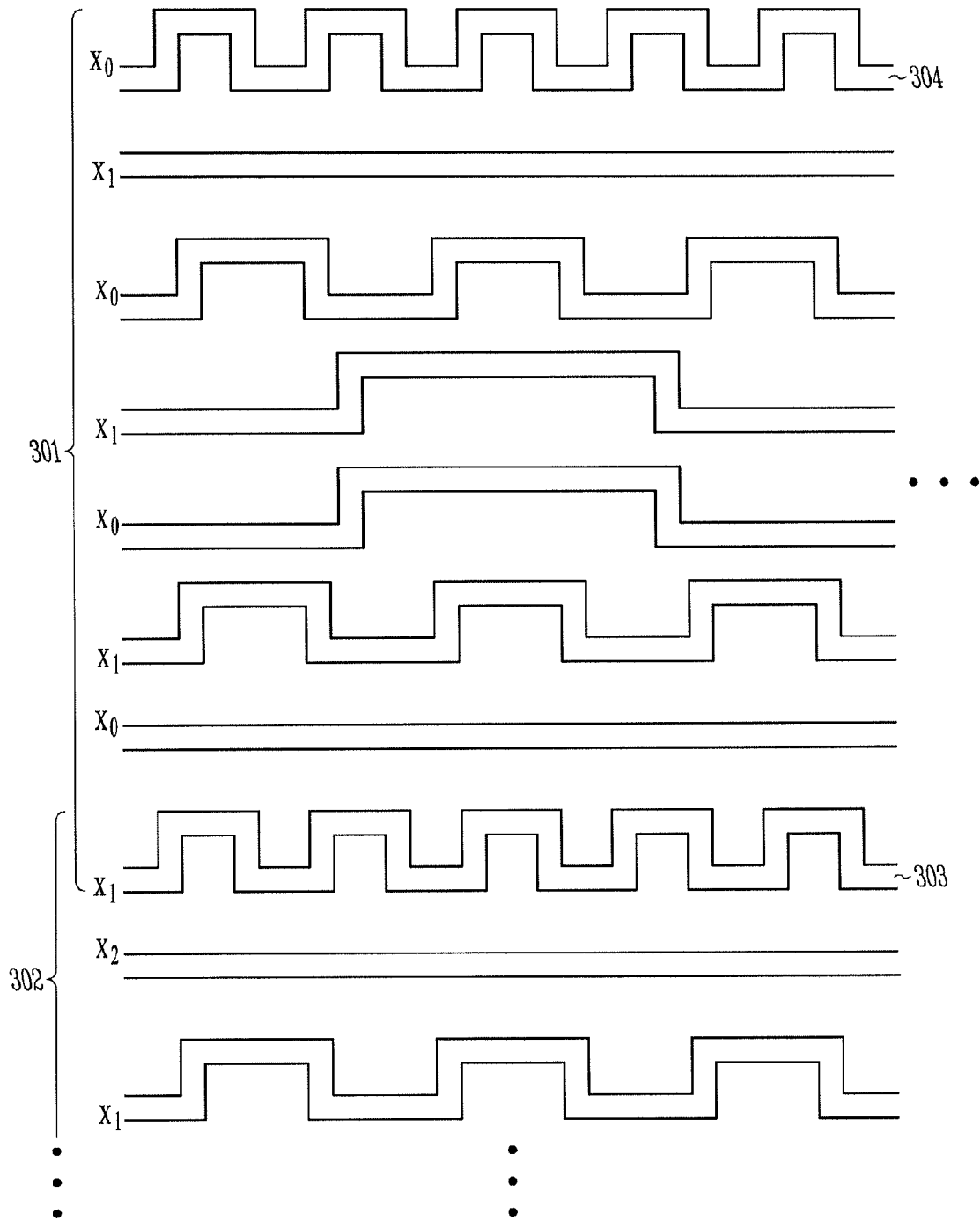
FIG. 3 illustrates a touchscreen having different combinations of electrodes that vary in degree of snaking, consistent with an example embodiment.

Some larger touchscreen embodiments will use principles similar to the electrode line snaking interpolation methods illustrated by FIG. 2. One example of a larger touchscreen is shown in FIG. 3, which illustrates a touchscreen assembly having ten X,Y electrode line pairs. Here, snaking of fine line metal touchscreen electrodes is used such that interpolation or proportionality between reductions in the X0, Y0 and X1, Y0 electrode pair capacitances can be used to determine the position of a finger on the touchscreen, much as was observed in the example of FIG. 2. The example of FIG. 2 shows use of six pairs of X drive and Y receive lines, having line pair lengths interpolated between the X0, Y0 and X1, Y0 drive signals, and the example of FIG. 3 extends this to a larger example showing eight pairs of lines interpolated between X0 and X1 drive signals, providing coverage of a somewhat larger screen area.

The example of FIG. 3 further extends its vertical coverage by transitioning from interpolation between X0, Y0 and X1, Y0 electrode pairs, as shown at 301, to interpolation between X1, Y0 and X2, Y0 electrode pairs, as shown at 302. Although the X1, Y0 electrode pair shown at 303 forming the bottom drive line pair of the touchscreen region 301 is of similar configuration as the X0, Y0 electrode pair shown at 304, much as the X1, Y0 electrode pair 206 of FIG. 2 repeats the snaking configuration of the X0, Y0 electrode pair of 201, FIG. 3's X1, Y0 electrode pair 204 also forms the top electrode pair used for interpolation of the second zone 302.

This provides a smooth transition between touchscreen zones as a finger, stylus, or other touch moves across the electrode pair 303 between zones 301 and 302. The zone 302 here simply repeats the patterns shown in zone 301's electrode pairs, but interpolates between X1, Y0 and X2, Y0 electrode pair rather than X0, Y0 and X1, Y0 electrode pair. Several additional zones can be similarly added to form even larger touchscreen displays, scaling to whatever resolution and size is required for a particular application.

In a further example, more zones than the number of separate X drive signals present can be implemented, so long as each zone interpolates between a different pair of X drive signals. For example, a touchscreen display having X0, X1, X2, and X3 drive signals may interpolate between X0 and X1 in a first region, X1 and X2 in a second region, X2 and X3 in a third region, X3 and X0 in a fourth region, etc. Such a scheme can enhance the resolution or size of a touchscreen that can be implemented with a given number of drive lines, particularly when the screen is configured to detect single touches.

Although the examples shown illustrate a variety of ways that degree of snaking of X/Y touchscreen line pairs can be used to detect finger position in one dimension in a touchscreen display, many touchscreen embodiments will also use multiple Y receive lines in electrode pair densities that vary in the horizontal direction to enable detection of a finger or other touch position in two dimensions.

Figure 4:
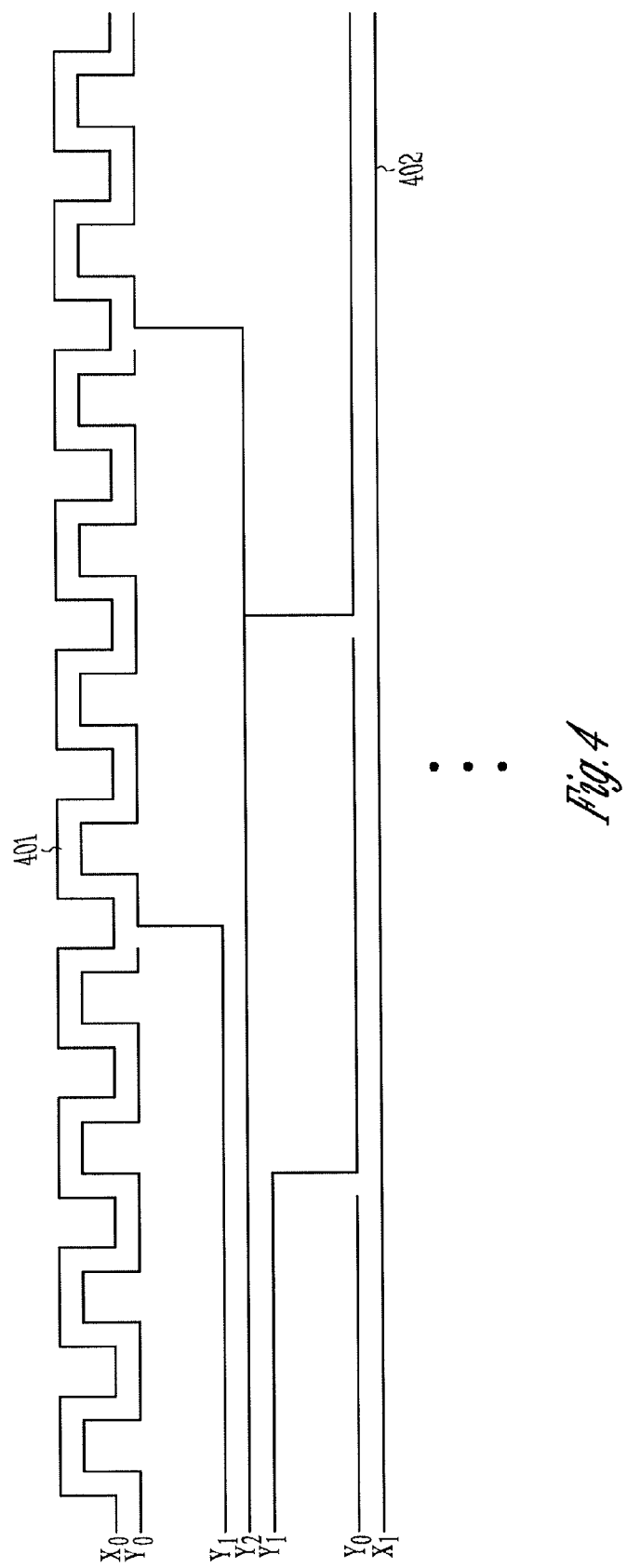
FIG. 4 illustrates a touchscreen having electrodes that vary in degree of snaking, along with Y receive lines that vary, consistent with an example embodiment.

FIG. 4 shows a more detailed example of a two-dimensional touchscreen using line snaking, expanding the example line pairs shown at 201 and 202 to use three Y receive lines Y0, Y1, and Y2. This provides touch position determination in both the vertical and horizontal dimensions, enabling determination of finger position in two-dimensional applications such as smart phones, touch screen kiosks, ATM machines, and the like.

Here, the X0 line at 401 and X1 line at 402 are substantially similar in configuration as the corresponding X0 and X1 drive lines at 201 and 202 of FIG. 2, but the Y receive line of FIG. 2 is replaced by three separate Y receive lines indicated Y0, Y1, and Y2. The Y receive lines are configured so that the left-most side of the touchscreen display has a greater proportion of Y0 lines capacitively coupling with the X0 and X1 drive lines, while the center has a greater proportion of Y1 lines and the right side has a greater proportion of Y2 lines capacitively coupling with the X drive lines. Touchscreen circuitry can therefore determine whether a reduction in capacitive coupling is observed in the Y0, Y1, or Y2 lines, or some proportional combination thereof, to determine the horizontal finger position on the touchscreen display.

For example, if a finger is on the left-most side of the touchscreen display, it will touch regions of the X0 and X1 drive lines that are most closely capacitively coupled to the Y0 receive lines. As the finger moves to the right, it begins to come in contact with the region of the X1 line at 402 that is more closely capacitively coupled to the Y1 receive line, eventually reaching the region of the X0 drive line at 401 that is most closely capacitively coupled to the Y1 receive line.

This staggered transition from Y0 to Y1 electrodes as the finger moves from left to right provides a degree of interpolation between the Y0 and Y1 regions also, because the Y lines in parallel with X1 transition from Y0 to Y1 before the Y lines in parallel with X0 transition from Y0 to Y1. As the finger continues to move further right, it reaches regions in which the X drive lines alternately become more closely coupled to the Y2 receive lines, such that the observed reduction in capacitance between the X drive lines and Y0, Y1, and Y2 receive lines can be used to further determine the horizontal position of the finger on the touchscreen display.

The touchscreens of FIGS. 2-4 have several advantages relative to that of FIG. 1, including the lack of a resistive material coupling the X drive lines to interpolate X drive signals between the X drive lines. Fewer different materials and process steps are therefore needed to form the touchscreen display of FIGS. 2-4, and a reduced connection count simplifies connection to external drive and control circuitry.

Because the X drive and Y receive lines in the examples such as FIG. 4 do not overlap in the active area of the touchscreen, the entire active display region of a two-dimensional touchscreen can be formed using a single step, such as a single fine line metal deposition step, resulting in a relatively efficient and inexpensive production process. Further, as lines do not cross in the active area of the touchscreen, there are no regions of the touchscreen display that are more opaque than others, as there are no "stacked" or overlapping lines.

Although the snaking illustrated here comprises a regular series of right angle turns, any variation in line direction or path from a straight line is considered snaking for purposes of the examples presented here, including wavy lines, zig-zag lines, randomized lines, or any other such deviation from a straight line path. The degree of snaking varies between lines in the embodiments shown here, and can similarly be determined in a number of ways in various embodiments, such as by determining the line length contained by a certain area representing a finger touch, centered over the mean line path.

Figure 5:
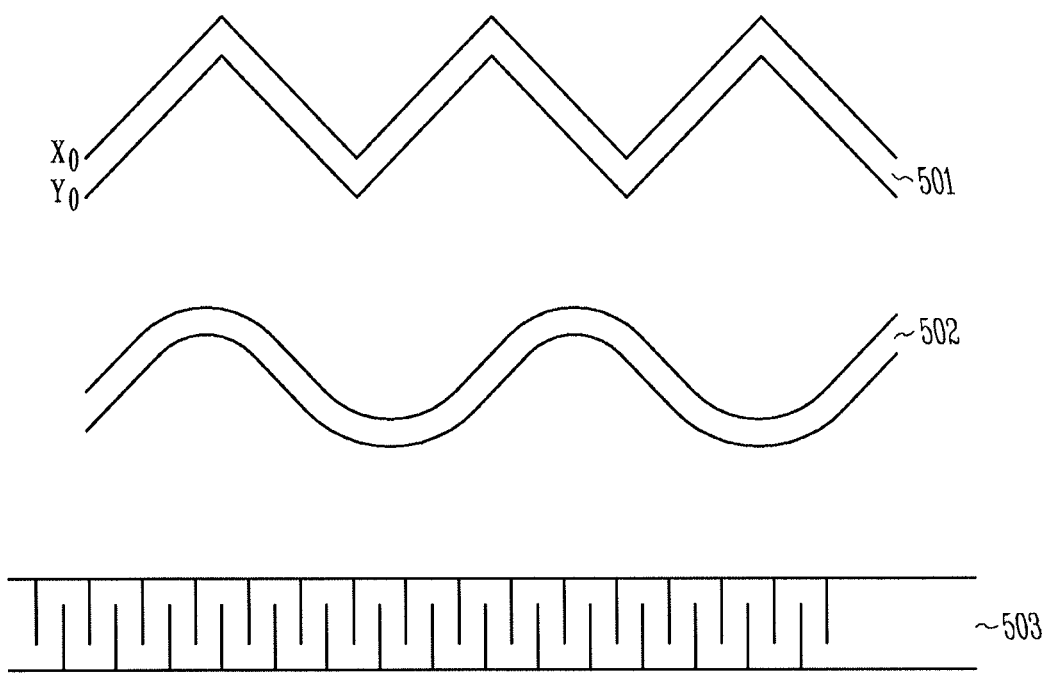
FIG. 5 illustrates a variety of electrode pair snaking patterns, consistent with an example embodiment.

FIG. 5 illustrates a variety of alternate electrode pair snaking patterns, as may be used in various touchscreen embodiments. At 501, a zig-zag pair of drive and receive electrodes is formed, and at 502 a wavy pair of electrodes is shown. Although the electrode pairs shown at 501 and 502 snake by altering the route of a pair of continuous lines having no breaks for forks, 503 illustrates a snaking pattern in which the path of a pair of substantially parallel electrodes have snaking features configured to increase the electrode line density in a given area by use of snaking features that fork off the main electrodes.

Figure 6:
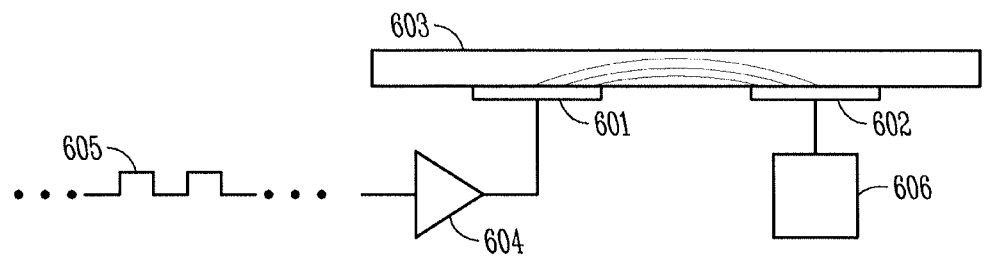
FIG. 6 shows a simple mutual capacitance touch sensing system, consistent with an example embodiment.

These examples of FIGS. 2-5 illustrate a variety of configurations in which the path an electrode pair takes across a touchscreen can be varied or snaked to enable proportional position sensing by detecting the relative change in capacitance in different drive and receive electrode pairs. This principle of mutual capacitance sensing can be observed using a simple drive/receive electrode configuration as illustrated in FIG. 6. Here, a drive electrode 601 and a receive electrode 602 are coupled to a dielectric front panel 603, such as may overlay a typical touchscreen display assembly. The drive electrode 601 is coupled to drive circuitry 604 that provides a series of drive pulses 605 to the drive electrode, and the receive electrode 602 is coupled to receive circuitry 606.

When the burst of pulses is provided to the drive electrode 601, the drive electrode's proximity to receive electrode 602 causes capacitive coupling between the two electrodes, and receive circuitry 606 can measure a charge between the drive and receive electrodes. When a finger is present in the vicinity of the drive and receive electrodes, the finger interferes with the capacitive coupling between the drive and receive electrodes, causing the charge measured in receive circuitry 506 to be reduced relative to the measured capacitance when a finger is not present.

Because the change in capacitance between the electrodes varies relative to the proximity of the finger to the electrodes, touch can be detected when a change in capacitance exceeds a certain threshold. Where more than one pair of touchscreen electrodes such as those of FIG. 6 are present, touch can be distinguished by determining where the greatest change in capacitance is observed, such as where a touch might otherwise effect multiple electrode pairs. In continuous region touchscreens such as that of FIG. 4, the change in observed capacitance between various drive and receive electrodes varies proportionately between different drive and receive electrode pairs depending on the location of the finger, as described in greater detail above.

Figure 7:
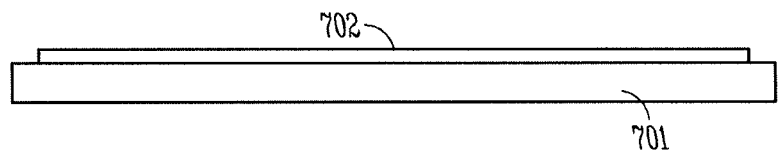
FIG. 7 shows a touchscreen assembly overlaying a display, consistent with an example embodiment.

A touchscreen display panel such as that of FIG. 4 can be used to overlay a display, such as a liquid crystal display or OLED display, as shown in FIG. 7. Here, a display assembly 701 is viewed from the edge, with the visible image side facing up. A touchscreen 702 is formed on the viewing surface of the display, and includes touchscreen electrodes and a cover to protect the various conductive components of the touchscreen. In a more detailed example, the touchscreen 702 comprises a dielectric protective layer covering a series of fine line metal wires, so that the fine wires only micrometers wide and thick are not damaged by physical contact.

Figure 8:
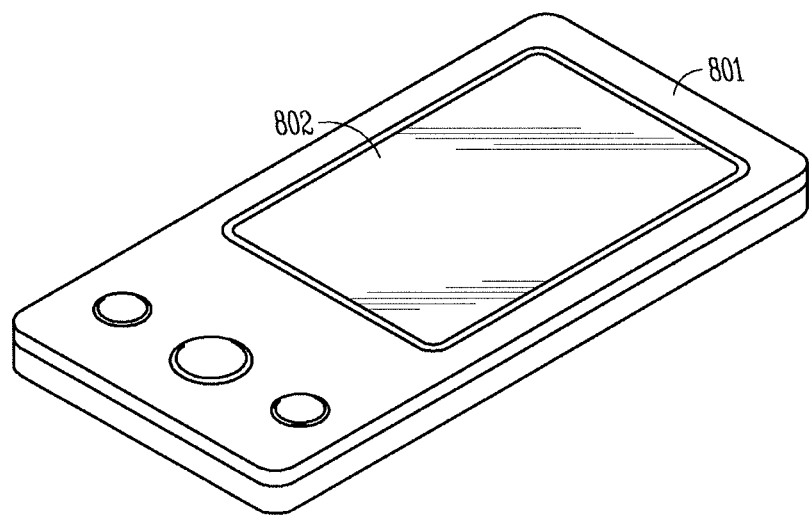
FIG. 8 shows a cellular telephone having a touchscreen display, consistent with an example embodiment.

Touchscreen displays such as that of FIG. 7 are often used in a variety of applications, from automatic teller machines (ATM machines), home appliances, personal digital assistants and cell phones, and other such devices. One such example cellular telephone and PDA device is illustrated in FIG. 8. Here, the cellular telephone device 801 includes a touchscreen display 802 comprising a significant portion of the largest surface of the device. The large size of the touchscreen 802 enables the touchscreen to present a wide variety of images that can serve along with touchscreen capability to provide input to the device, including a keyboard, a numeric keypad, program or application icons, and various other interfaces as desired.

The user may interact with the device by touching with a single finger, such as to select a program for execution or to type a letter on a keyboard displayed on the touchscreen display assembly 802, or may use multiple touches such as to zoom in or zoom out when viewing a document or image. In other devices, such as home appliances, the display does not change or changes only slightly during device operation, and may recognize only single touches at a time.

Although the example touchscreen display of FIG. 4 is configured as a rectangular grid, other configurations are possible and are within the scope of the invention, such as a touchwheel, a linear slider, buttons with reconfigurable displays, and other such configurations. Varying the proportionate density of snaked electrode pairs across the touchscreen can be adapted to any such shape, enabling detection of the region of touch on the touchscreen.

Many materials and configurations will be suitable for forming touchscreens such as those described herein, including fine line metal as in the examples above, as well as metal wire, conductive polymers, Indium tin oxide, and other materials in some embodiments. In some touchscreens, it is desirable that the conductive material be either transparent, such as Indium tin oxide or transparent conductive polymer, or be so small as to not significantly interfere with visibility of the display, such as with fine line metal.

Fine line metal wires in a more detailed example comprise wires that are approximately 10 micrometers or less in width, or another similar suitable size such as between 3-7 micrometers in width. The very small line width enables placement of many lines per millimeter in some embodiments, as the total line density can in various embodiments cover a fraction of a percent to 10% of the total screen area without significantly impacting the visibility of an image through the touchscreen.

Although the snaking element touchscreen examples given here generally rely on mutual capacitance to operate, other embodiments will use other technologies, including other capacitance measures such as self-capacitance of snaked lines, resistance, or other such sense technologies.

These example touchscreen assemblies illustrate how a touchscreen can be formed using snaking drive and receive lines that vary in line density by snaking to various degrees. In some examples, the electrodes do not overlap in the active area or field of the touchscreen, eliminating the extra materials, expense, and production steps needed to form resistively-coupled element touchscreens such as that of FIG. 1.

Configurations such as the example of FIG. 4 provide an efficient system for generating an accurate reading of a finger's location on even relatively complex two-dimensional touchscreens. These benefits simplify operation of the touchscreen panel, as fewer connections and less filtering and other data processing are needed to ensure reliable touchscreen operation. This in turn leads to lower power consumption in an electronic device incorporating such a touchscreen display assembly, improving power efficiency, increasing battery life, and reducing resource use such as memory and processor consumption.

The invention claimed is:

1. An assembly, comprising:
 a first plurality of electrode pairs distributed across an active area of a touchscreen, each electrode pair of the first plurality of electrode pairs being formed in a pattern, the patterns of the first plurality of electrode pairs decreasing in frequency of snaking from electrode pair to electrode pair in a first direction; and
 a second plurality of electrode pairs distributed across the active area of the touchscreen, each electrode pair of the second plurality of electrode pairs being formed in a pattern, the patterns of the second plurality of electrode pairs increasing in frequency of snaking from electrode pair to electrode pair in the first direction;
 wherein a position of a touch can be determined in the first direction based at least in part on proportionate density of the first plurality of electrode pairs and the second plurality of electrode pairs in an area of the touch;

wherein a first electrode pair comprises:
a drive electrode; and
a receive electrode adjacent to and substantially parallel with the drive electrode; and
wherein at least one receive electrode in the first plurality of electrode pairs is directly coupled to at least one receive electrode in the second plurality of electrode pairs.

2. The assembly of claim 1, wherein the electrode pairs are evenly distributed along the first direction.

3. The assembly of claim 1, further comprising:
an extended portion of the active area of the touchscreen extending the touchscreen in the first direction; and
a third plurality of electrode pairs distributed across the extended portion of the active area of the touchscreen, each electrode pair formed in a pattern, the patterns of the third plurality of electrode pairs increasing in frequency of snaking from electrode pair to electrode pair in the first direction across the extended portion of the touchscreen;
wherein the second plurality of electrode pairs are distributed across the extended portion of the active area of the touchscreen, each the second electrode pair formed in a pattern, the patterns of the second plurality of electrode pairs decreasing in frequency of snaking from electrode pair to electrode pair in the first direction across the extended portion of the touchscreen.

4. The assembly of claim 1, wherein the first electrode pair comprises a fine line metal electrode having at least one conductive line with a line width of 10 micrometers or less.

5. The assembly of claim 1, wherein:
the first electrode pair further comprises a second receive electrode adjacent to and substantially parallel with the drive electrode;
density of the first receive electrode adjacent to and substantially parallel with the drive electrode increases in a second direction not parallel the first direction; and
density of the second receive electrode adjacent to and substantially parallel with the drive electrode decreases in the second direction.

6. The assembly of claim 1, wherein:
the first electrode pair further comprises a second receive electrode adjacent to and substantially parallel with the drive electrode;
the first receive electrode in the first electrode pair is arranged so that capacitive coupling between the first receive electrode and the drive electrode is greater in a first region along a second direction and smaller in a second region along the second direction, the second direction not parallel the first direction; and
the second receive electrode in the first electrode pair is arranged so that capacitive coupling between the second receive electrode and the drive electrode is greater in the second region along the second direction and smaller in the first region along the second direction.

7. The assembly of claim 6, wherein the first region of the first electrode pair is staggered along the second direction from the first region of a neighboring electrode pair.

8. The assembly of claim 6, wherein:
first receive electrodes in the first plurality of electrode pairs and in the second plurality of electrode pairs are directly coupled to one another; and
second receive electrodes in the first plurality of electrode pairs and in the second plurality of electrode pairs are directly coupled to one another.

9. The assembly of claim 1, wherein a receive electrode of the first electrode pair is separated from a drive electrode of a neighboring electrode pair by a receive electrode of the neighboring electrode pair.

10. An assembly, comprising:
a first plurality of electrodes distributed across an active area of a touchscreen, each electrode formed in a snaking pattern and running generally along a first direction; and
a second plurality of electrodes distributed across the active area of the touchscreen, each electrode formed in a snaking pattern;
wherein a position of a touch can be determined based at least in part on proportionate density of the first plurality of electrodes and the second plurality of electrodes in an area of the touch;
wherein a first receive electrode of the second plurality of electrodes is arranged so that capacitive coupling between the first receive electrode and a drive electrode of the first plurality of electrodes is greater in a first region along the first direction and smaller in a second region along the first direction; and
wherein a second receive electrode of the second plurality of electrodes is arranged so that capacitive coupling between the second receive electrode and the drive electrode is greater in the second region along the first direction and smaller in the first region along the first direction.

11. The assembly of claim 10, wherein a first electrode of the first plurality of electrodes comprises fine line metal having a line width of 10 micrometers or less.

12. The assembly of claim 10, wherein a first electrode of the first plurality of electrodes comprises a single line of fine line metal having a line width of 10 micrometers or less.

13. The assembly of claim 10, wherein the first plurality of electrodes pairs are evenly distributed along a second direction not parallel the first direction.

14. A method, comprising:
forming a first plurality of electrode pairs distributed across an active area of a touchscreen, each electrode pair of the first plurality of electrode pairs being formed in a pattern, the patterns of the first plurality of electrode pairs decreasing in frequency of snaking from electrode pair to electrode pair in a first direction; and
forming a second plurality of electrode pairs distributed across the active area of the touchscreen, each electrode pair of the second plurality of electrode pairs being formed in a pattern, the patterns of the second plurality of electrode pairs increasing in frequency of snaking from electrode pair to electrode pair in the first direction;
wherein a position of a touch can be determined in the first direction based at least in part on proportionate density of the first plurality of electrode pairs and the second plurality of electrode pairs in an area of the touch;
wherein a first electrode pair comprises a drive electrode and a first and second receive electrode adjacent to and substantially parallel with a drive electrode;
wherein density of the first receive electrode adjacent to and substantially parallel with the drive electrode increases in a second direction not parallel the first direction;
wherein density of the second receive electrode adjacent to and substantially parallel with the drive electrode decreases in the second direction; and wherein at least one receive electrode in the first plurality of electrode pairs is directly coupled to at least one receive electrode in the second plurality of electrode pairs.

15. The method of claim 14, further comprising:
forming a third plurality of electrode pairs distributed across an extended portion of the active area of the touchscreen, each electrode pair formed in a pattern, the patterns of the third plurality of electrode pairs increasing in frequency of snaking from electrode pair to electrode pair in the first direction across the extended portion of the touchscreen;
wherein the second plurality of electrode pairs are distributed across the extended portion of the active area of the touchscreen, each of the second plurality of electrode pairs formed in a pattern, the patterns of the second plurality of electrode pairs decreasing in frequency of snaking from electrode pair to electrode pair in the first direction across the extended portion of the touchscreen.

16. The method of claim 14, wherein the first electrode pair comprises a fine line metal electrode having at least one conductive line with a line width of 10 micrometers or less.

17. The method of claim 14, further comprising:
arranging the first receive electrode in the first electrode pair so that capacitive coupling between the first receive electrode and the drive electrode is greater in a first region along a second direction and smaller in a second region along the second direction, the second direction not parallel the first direction; and
arranging the second receive electrode in the first electrode pair so that capacitive coupling between the second receive electrode and the drive electrode is greater in the second region along the second direction and smaller in the first region along the second direction.

18. The method of claim 17, wherein the first region of the first electrode pair is staggered along the second direction from the first region of a neighboring electrode pair.

* * * * *